(12) United States Patent
Lanxner et al.

(10) Patent No.: US 8,321,360 B2
(45) Date of Patent: Nov. 27, 2012

(54) METHOD AND SYSTEM FOR WEIGHTING TRANSACTIONS IN A FRAUD DETECTION SYSTEM

(75) Inventors: Eyal S. Lanxner, Modiin (IL); Shay Raz, Ramat-Hasharon (IL); Oren Gross, Even-Yehuda (IL)

(73) Assignee: Symantec Corporation, Mountain View, CA (US)

( * ) Notice: Subject to any disclaimer, the term of this patent is extended or adjusted under 35 U.S.C. 154(b) by 610 days.

(21) Appl. No.: 12/604,208

(22) Filed: Oct. 22, 2009

(65) Prior Publication Data

US 2011/0099628 A1    Apr. 28, 2011

(51) Int. Cl.
*G06F 15/18* (2006.01)
*G06E 1/00* (2006.01)
*G06E 3/00* (2006.01)
*G06G 7/00* (2006.01)

(52) U.S. Cl. .......................................... 706/20
(58) Field of Classification Search ....................... 706/20
See application file for complete search history.

(56) References Cited

U.S. PATENT DOCUMENTS

| | | | |
|---|---|---|---|
| 7,089,592 B2 | 8/2006 | Adjaoute | |
| 7,213,049 B2 * | 5/2007 | Felt et al. | 709/203 |
| 7,419,428 B2 * | 9/2008 | Rowe | 463/25 |
| 7,509,261 B1 * | 3/2009 | McManus et al. | 705/313 |
| 7,523,016 B1 | 4/2009 | Surdulescu et al. | |
| 7,603,363 B2 * | 10/2009 | Haselden et al. | 705/1.1 |
| 7,993,197 B2 * | 8/2011 | Kaminkow | 463/25 |
| 8,195,664 B2 * | 6/2012 | Lanxner et al. | 707/737 |
| 2006/0101402 A1 | 5/2006 | Miller et al. | |
| 2008/0033637 A1 | 2/2008 | Kuhlman et al. | |
| 2008/0086409 A1 | 4/2008 | Moorman et al. | |
| 2009/0018940 A1 | 1/2009 | Wang et al. | |
| 2009/0150214 A1 | 6/2009 | Mohan | |

FOREIGN PATENT DOCUMENTS

WO   WO 2007/044763   4/2007
WO   WO 2007/095242   8/2007

OTHER PUBLICATIONS

Guha, "ROCK: A Robust Clustering Algorithm for Categorical Attributes," Inf. Syst. 25(5): 345-366 (2000), 25 pages total.
VeriSign Fraud Detection Service [white paper] prepared by VeriSign Authentication Service, dated Mar. 28, 2006, 4 pages total.
VeriSign® Identity Protection (VIP) Fraud Detection Service: Data Sheet [white paper] 2008, 4 pages total.
U.S. Appl. No. 12/604,220, filed Oct. 22, 2009, first named inventor: Eyal S. Lanxner.

* cited by examiner

*Primary Examiner* — Michael B Holmes
(74) *Attorney, Agent, or Firm* — Lowenstein Sandler PC

(57) ABSTRACT

A method of computing a similarity between a first transaction having a set of properties and a second transaction having the set of properties includes computing an initial weight for each of the properties of the set of properties and computing a similarity between each of the properties of the first transaction and the properties of the second transaction. The method also includes adjusting the initial weight for each of the properties based on a measure of the commonness of each of the properties of the set of properties, normalizing the adjusted weights, and computing the similarity by summing the products of the normalized adjusted weights and the computed similarities.

21 Claims, 9 Drawing Sheets

Iteration #

1

2

3

4

5,6,7

Case 1

Case 2

METHOD AND SYSTEM FOR WEIGHTING TRANSACTIONS IN A FRAUD DETECTION SYSTEM

CROSS-REFERENCES TO RELATED APPLICATIONS

The following two regular U.S. patent applications (including this one) are being filed concurrently, and the entire disclosure of the other application is incorporated by reference into this application for all purposes:
application Ser. No. 12/604,208, filed on Oct. 22, 2009, entitled "Method and System for Weighting Transactions in a Fraud Detection System"; and
application Ser. No. 12/604,220, filed on Oct. 22, 2009, entitled "Method and System for Clustering Transactions in a Fraud Detection System".

BACKGROUND OF THE INVENTION

Identity theft and on-line fraud have become widespread problems in the United States. Each year, many adults in the U.S. have their identities stolen and numerous accounts are compromised, leading to significant losses as a result of identity theft. While the fraud losses themselves are significant, even more worrisome has been the negative impact to enterprises whose consumers have been victim to these breaches. Account churn, lower transaction volume, and even lower stock prices have made the extent of the losses hard to bear for most enterprises.

Weak authentication has led to Internet identity theft, phishing, and on-line financial fraud. As more consumers use computers and mobile devices for shopping, managing their finances, and accessing health care information, the risk of fraud and identity theft increases. Because of the impact of identity theft and on-line fraud on on-line businesses, more and more enterprises are evaluating authentication and security options for their on-line consumer base. This trend to improve security has also been driven by regulatory guidance related to strengthening authentication and security measures.

Fraud detection systems utilize methods and systems to authenticate users in order to secure employee and business-partner access to corporate networks and applications. The risk of enabling unauthorized access to corporate assets justifies the investment and change in behavior needed to deploy strong authentication. Fraud prevention thus enables the enterprise to make a fairly straightforward risk/reward evaluation. However, because these enterprise solutions have been designed for lower volume deployments, utilizing them for securing consumer applications is not entirely feasible. Scaling these enterprise authentication solutions to millions of users in a cost effective manner is nearly impossible.

Accordingly, there is a need in the art for a system and method to improve identity protection for consumers and prevent fraud in on-line transactions.

SUMMARY OF THE INVENTION

The present invention relates generally to computer networks. More specifically, the present invention relates to methods and systems for detecting and preventing fraudulent on-line transactions. Merely by way of example, the invention has been applied to a method of weighting transaction properties to compute a similarity value between transactions. The methods and techniques can be applied to a variety of computer networks and communications systems.

According to an embodiment of the present invention, a method of computing a similarity between a first transaction having a set of properties and a second transaction having the set of properties is provided. The method includes computing an initial weight for each of the properties of the set of properties and computing a similarity between each of the properties of the first transaction and the properties of the second transaction. The method also includes adjusting the initial weight for each of the properties based on a measure of the commonness of each of the properties of the set of properties, normalizing the adjusted weights, and computing the similarity by summing the products of the normalized adjusted weights and the computed similarities.

According to another embodiment of the present invention, a system for determining a similarity between a first transaction having a set of properties and a second transaction having the set of properties is provided. The system includes a data processor and a computer-readable medium storing a plurality of instructions for controlling the data processor to compute the similarity. The plurality of instructions include instructions that cause the data processor to compute an initial weight for each of the properties of the set of properties and instructions that cause the data processor to compute a similarity between each of the properties of the first transaction and the properties of the second transaction. The plurality of instructions also include instructions that cause the data processor to adjust the initial weight for each of the properties based on a measure of the commonness of each of the properties of the set of properties, instructions that cause the data processor to normalize the adjusted weights, and instructions that cause the data processor to compute the similarity by summing the products of the normalized adjusted weights and the computed similarities. The system further includes a communications module.

According to a specific embodiment of the present invention, a method of determining a similarity between two transactions of a set of transactions is provided. Each of the transactions has a plurality of properties. The method includes computing an estimated number of clusters for the set of transactions, computing an initial weight for each of the plurality of properties of the transactions, and computing a joint probability for each of the plurality of properties. The method also includes computing a correction factor for each of the properties based on the joint probability and computing a normalized weight for each of the plurality of properties based on the initial weight and the correction factor. The method further includes determining a similarity between the plurality of properties and computing the similarity between the two transactions based on the normalized weight and the similarity between the plurality of properties.

Many benefits are achieved by way of the present invention over conventional techniques. For example, embodiments of the present invention provide more accurate weights for transaction properties, increasing the accuracy of fraud detection systems. Additionally, embodiments of the present invention take both user behavior as well as the distribution of a property among the general population into account in determining the property weights. Moreover, embodiments of the present invention provide an improved characterization of the subject (user/account/stock) behavior. Thus, the ability to understand and rate the dominant properties of the subject and to better determine whether a potential transaction can be attributed to the subject or not is improved. Furthermore, embodiments of the present invention aid in overall fraud detection.

Other embodiments provide a method to weight the different properties that are associated with subject entity. This weighting method is more accurate than conventional techniques, since rather than being static (e.g., always giving each property a fixed weight), it adapts dynamic weights for each user in customized manner, based on the particular data distribution. In addition, specific embodiments consider the prevalence of one or more properties in the population, providing a weighting that combines the subject data distribution as well as the overall population data distribution. These and other embodiments of the invention along with many of its advantages and features are described in more detail in conjunction with the text below and attached figures.

DETAILED DESCRIPTION OF SPECIFIC EMBODIMENTS

Figure 1:
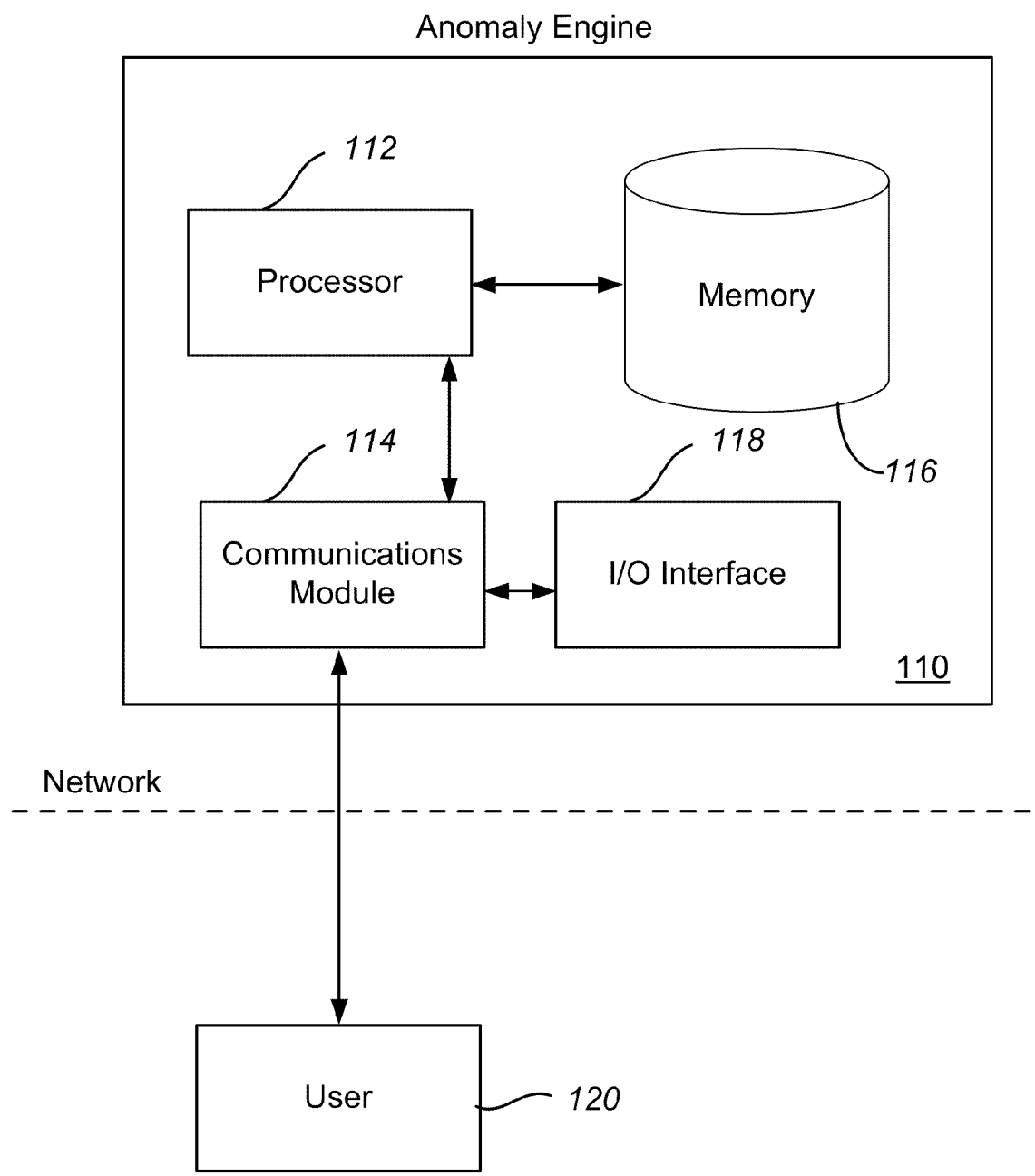
FIG. 1 is a simplified schematic diagram illustrating elements of an anomaly engine according to an embodiment of the present invention.

Embodiments of the present invention can be used to construct models of the behavioral pattern of Internet users and are useful as components of an anomaly engine, also referred to as a behavioral engine. Anomaly engines, in turn, are components of Internet fraud detection and mitigation systems. FIG. 1 is a simplified schematic diagram of elements of an anomaly engine according to an embodiment of the present invention. The anomaly engine 110 includes a processor 112 (also referred to as a data processor), a communications module 114 and a memory 116. The processor 112 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 112 is coupled to the memory 116 in order to access stored information for use during fraud detection processes. The memory (also referred to as a database or a computer readable medium) 116 can be local or distributed as appropriate to the particular application. An input/output interface 118 is provided to facilitate control of the anomaly engine by a system operator. The I/O interface 118 also provides a mechanism for delivering performance reports to a system operator, other suitable personnel, or suitable computer systems.

A user 120 interacts with the anomaly engine 110 through a network, for example, the Internet. Patterns of behavior during on-line transactions are monitored by the anomaly engine, for example, the characteristics of a user log-in from a location such as Mountain View, Calif., using the Firefox browser and the Windows operating system. For this transaction (a log-in transaction), several properties are associated with the transaction including the browser type, the operating system, and the like. Patterns associated with financial transactions such as a money transfer can include a periodicity and a range of amount transferred. Using information related to these behavioral patterns, the anomaly engine can construct a user pattern and identify anomalies in the behavior, which can suggest that a transaction is suspicion if it does not follow the typical behavioral pattern for the particular user.

Embodiments of the present invention provide a method and system for determining the similarity between two transactions. If the similarity between two transactions exceeds a predetermined threshold value, then the two transactions are considered to be neighbors. Equation (1) illustrates this condition for transaction $t_1$, transaction $t_2$, and threshold value $\theta$.

$$\text{sim}(t_1, t_2) \geq \theta \qquad (1)$$

Figure 2:
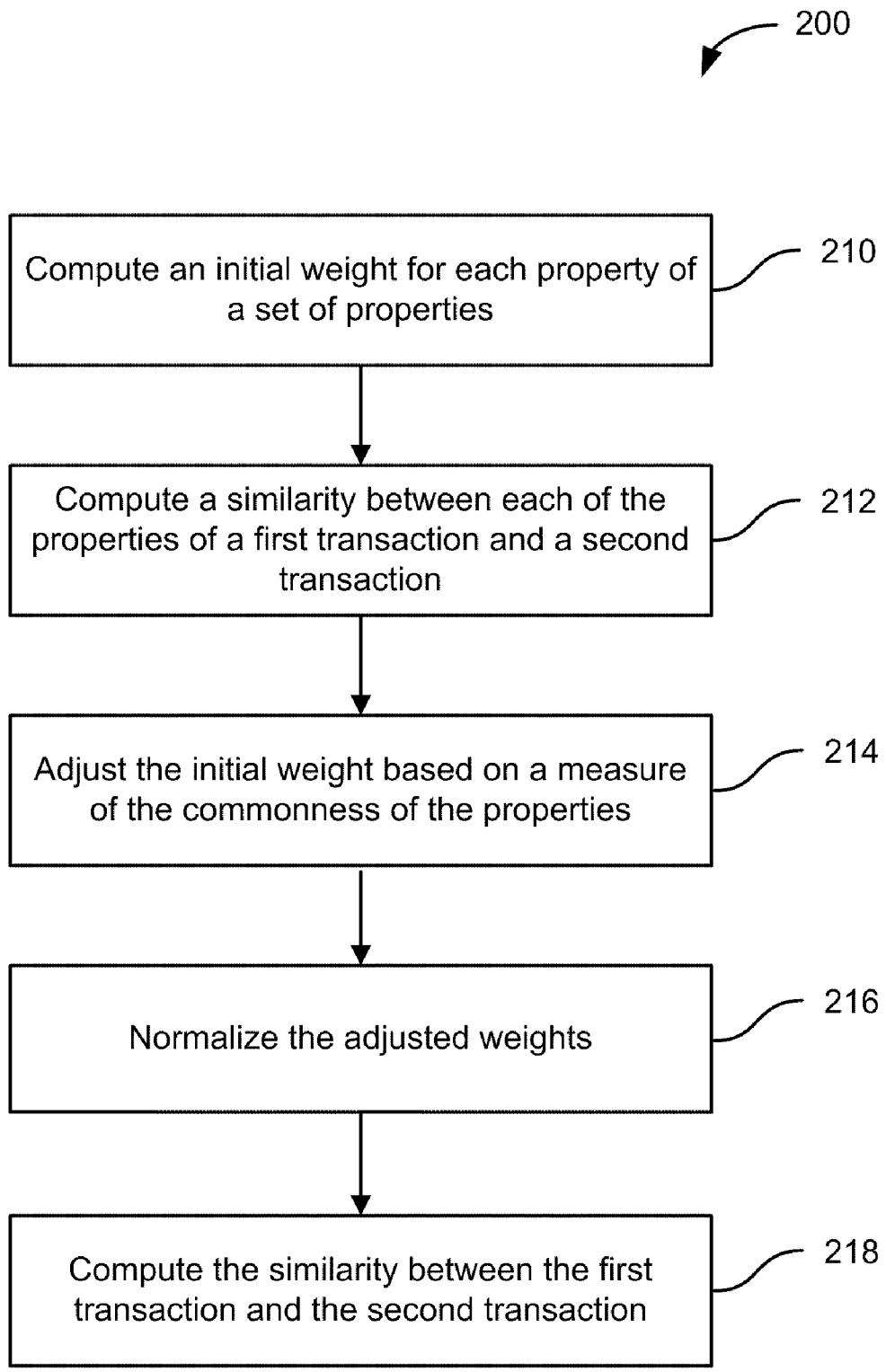
FIG. 2 is a simplified flowchart illustrating a method of determining a similarity between transactions according to an embodiment of the present invention.

FIG. 2 is a simplified flowchart illustrating a method of determining a similarity between transactions according to an embodiment of the present invention. The method (200) includes computing an initial weight for each property of a set of properties (210). Each transaction will be characterized by several properties, also referred to as fields. These properties include, without limitation, an operating system, a browser type (e.g., Internet Explorer, Firefox, Chrome, or the like) a browser version, an IP address associated with the user's activity, a geographical location of the IP address, or the like. The operating system and browser properties are derivatives of the User-Agent and the geographical location and connection are derivatives of the IP address.

Merely by way of example, information extracted from an IP address can be categorized as geographical location (e.g., country, city, state, longitude, latitude, or the like) and connection information (e.g., Carrier, SLD, Organization, Routing Type, Connection Type, or the like). Properties for login transactions may be User-Agent derivatives (e.g., OS, Browser, or the like) and IP derivatives (e.g., Location, Connection). For money transfer transactions the properties include Amount, Destination institution name, Destination institution country, and Transfer category. For trading, properties include Stock's risk levels, Stock's exchange market, Stock's origin country, Stock's market cap, Stock's industry, or the like. One or more of these properties can be used in the various embodiments described herein.

For two transactions, the similarity between the each of the properties of the two transactions will be determined. After performing this computation for each of the properties, a weighted average will be determined. Normalization can be performed by summing the weights to one as described more fully below. In summary, in an embodiment, for each transaction, the properties of the transaction are analyzed to determine the similarity between transactions as well as the average similarity between transactions. Table 1 lists seven transactions and the browser type and version associated with each transaction.

TABLE 1

| Transaction Number | Property |
|---|---|
| 1 | IE 6.0 |
| 2 | IE 7.0 |
| 3 | Firefox - 1.5 |
| 4 | Firefox - 1.0 |
| 5 | IE 6.0 |
| 6 | Safari |
| 7 | IE 6.0 |

Based on the data in Table 1, a property similarity matrix can be formed using the transaction numbers and the browser properties for each transaction. In order to build the property similarity matrix, which has the transaction property numbers as the row and column headers, the following similarity values are assigned to each combination of transaction properties as a function of the browser type and browser version:

1—browser type & browser version are equal
0.8—browser type is equal
0—browser type is not equal

TABLE 2

|   | 1 | 2 | 3 | 4 | 5 | 6 | 7 |
|---|---|---|---|---|---|---|---|
| 1 | — | 0.8 | 0 | 0 | 1 | 0 | 1 |
| 2 |   | — | 0 | 0 | 0.8 | 0 | 0.8 |
| 3 |   |   | — | 0.8 | 0 | 0 | 0 |
| 4 |   |   |   | — | 0 | 0 | 0 |
| 5 |   |   |   |   | — | 0 | 1 |
| 6 |   |   |   |   |   | — | 0 |
| 7 |   |   |   |   |   |   | — |

Referring to Table 2, the average property similarity between transactions can be computed as the weighted average of the similarity values. For the similarity values in Table 2, the average similarity between properties for the internet browser type and version properties is:

$$AvgSim = \frac{14*0 + 4*0.8 + 3*1}{21} = 0.37, \qquad (2)$$

since there are 14 values equal to zero, four values equal to 0.8, and three values equal to 1.0.

Figure 3:
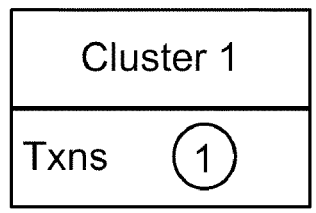
FIG. 3 is a simplified cluster diagram according to an embodiment of the present invention.
Figure 3:
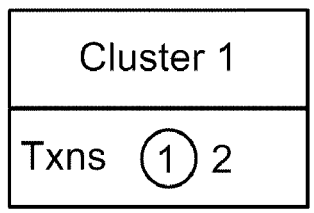
Figure 3:
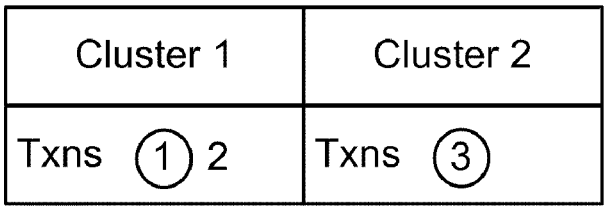
Figure 3:
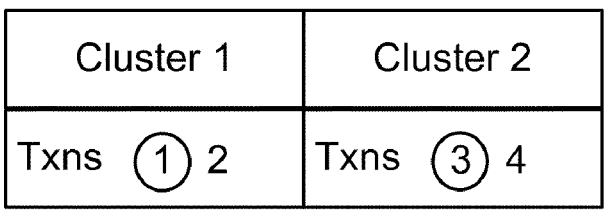
Figure 3:
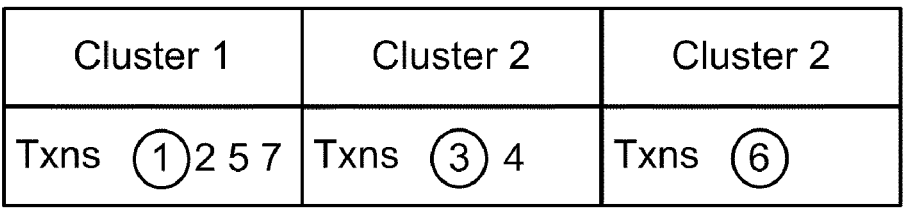

FIG. 3 is a simplified cluster diagram according to an embodiment of the present invention. Given a similarity threshold of 0.5 for any compared values, the transactions are analyzed in turn. The first transaction (i.e., IE 6.0) will form the first cluster in iteration 1 and will be the representative transaction for this first cluster. Next, in iteration 2, transaction 2 (i.e., IE 7.0) shares the same browser type, but a different browser version, resulting in a similarity value of 0.8. Since this is above the threshold of 0.5, the second transactions joins the first cluster, but not as the representative transaction.

In iteration 3, the third transaction is compared to the representative transaction of the first cluster and since the browser types are dissimilar, the similarity value is 0. Thus, transaction 3 forms a second cluster as the representative transaction of this second cluster. In iteration 4, the fourth transaction is compared to the representative transaction of the first cluster and since the browser types are dissimilar, the similarity value is 0. The fourth transaction is then compared to the representative transaction of the second cluster. Since both the third and fourth transactions utilize the Firefox browser, but with different versions, the similarity value is 0.8, which is greater than the threshold of 0.5 Thus, the fourth transaction joins the second cluster, but not as the representative transaction.

In the fifth iteration, the fifth transaction has the same browser type and version as the first transaction and joins the first cluster. In the sixth iteration, the sixth transaction is compared to both the first transaction and the third transaction (similarity value=0 for both since the browser types are dissimilar). Thus, the sixth transaction forms a third cluster. The seventh transaction has a similarity value of 1 in comparison with the first transaction and joins the first cluster. Referring to FIG. 3, the seven transactions form three clusters based on the three logical values for the browser type: Internet Explorer, Firefox, and Safari. Each cluster of transactions represents a user behavior.

It should be noted that FIG. 3 provides an example of a method of clustering transactions and is not intended to limit the scope of the present invention. An output of the method illustrated in FIG. 3 is the value of the estimated number of clusters in the transaction environment (i.e., est) utilized in equation (6). Other methods of determining the estimated number of clusters are also included within the scope of the present invention, for example, using equation (3).

In general, in order to measure the difference between transactions, multiple properties are analyzed. For purposes of clarity, in the above example, the difference between transactions was only a function of the browser properties. However, additional properties can also be analyzed to determine the similarity between transactions. For example, if one wants to measure the geographical similarity between two transactions, the IP addresses of the transactions would be used to determine the geographical location of the transactions. The geographical similarity or difference between the transactions, may depend on the geographical distance, the geopolitical differences between the two locations (e.g., different countries, states, or the like), and the like. The geographical similarity will be computed using an algorithm that is appropriate for determining geographical differences. One of ordinary skill in the art would recognize many variations, modifications, and alternatives.

Several examples of property similarity calculations are provided below. A first set of examples for the geographical distance property are illustrated in Tables 3-5. For this property, the input used in determining the similarity for this property is the IP address of the transaction. Using geolocation tools, the latitude and longitude of the IP address are extracted, along with the country, state, and city of the transaction. The geographical distance comparator receives two transactions as inputs and considers the physical distance as well as the geo-political properties of the transactions (e.g., do the transactions reside in the same country/state/city).

TABLE 3

|   | Transaction A | Transaction B |
|---|---|---|
| Country | US | US |
| State | California | NY |
| City | San Francisco | NY |
| Distance | 3,000 miles | |
| Similarity | 0.6 | |

TABLE 4

| | Transaction A | Transaction B |
|---|---|---|
| Country | US | US |
| State | California | California |
| City | San Francisco | Los Angeles |
| Distance | | 400 miles |
| Similarity | | 0.8 |

TABLE 5

| | Transaction A | Transaction B |
|---|---|---|
| Country | US | Israel |
| State | California | Gosh-Dan |
| City | San-Francisco | Tel-Aviv |
| Distance | | 8700 miles |
| Similarity | | 0.1 |

Referring to Tables 3-5, as the distance between the locations of the transactions increases, the similarity decreases. Additionally, the change in country from US to Israel in Table 5 also decreases the similarity between transactions. One of ordinary skill in the art would recognize many variations, modifications, and alternatives.

As another example of similarity calculations, the similarity for the browser property is illustrated in Tables 6-7. The input used to determine the similarity of the property is the User-Agent (UA) of the transaction. Using parsing, the browser and the version are extracted from the UA string. The browser comparator receives these parameters for two transactions, and outputs the similarity between them. In general, for two different browsers, the similarity will be low, whereas for the same browser, but with different versions, the similarity will be high.

TABLE 6

| | Transaction A | Transaction B |
|---|---|---|
| Browser | IE | FireFox |
| Version | 8.0 | 3.0 |
| Similarity | | 0 |

TABLE 7

| | Transaction A | Transaction B |
|---|---|---|
| Browser | IE | IE |
| Version | 8.0 | 7.0 |
| Similarity | | 0.8 |

In the similarity calculation illustrated in Table 6, the difference between browser type results in the similarity being zero. In other models, the similarity can be non-zero, even if the browser type is different. The consecutive version numbers illustrated in Table 7 result in a high similarity of 0.8.

According to one embodiment of the present invention, the estimated number of clusters in the transaction environment (i.e., est) is calculated based on the average similarity between transactions when considering a property with property index=i.

$$est_i = \frac{N}{1 + AvgSim_i \cdot (N-1)}, \quad (3)$$

where N is the number of transactions. In some embodiments, isolated transactions are omitted in determining N. $AvgSim_i$ is the average similarity for a property shared by a set of transactions and can also be written as AvgSim. Thus, the property index used in equation (3) will change as several properties are considered, with each property being assigned an index value and the estimated number of clusters in the transaction environment will be determined for each of the properties.

Figure 5:
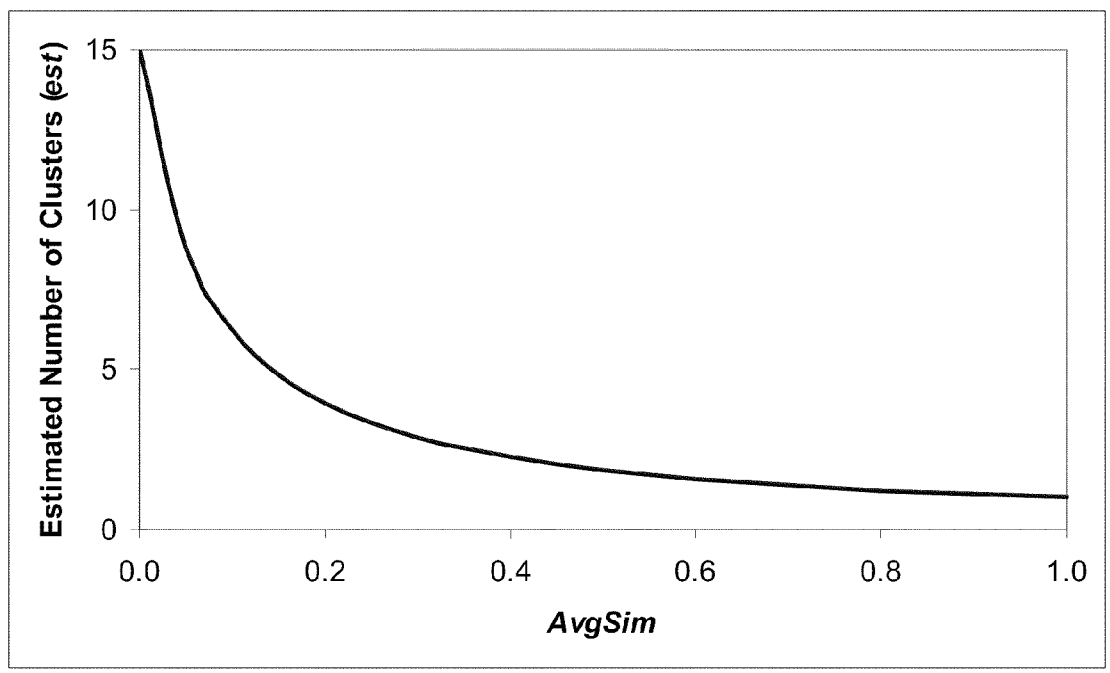
FIG. 5 is a simplified plot of the estimated number of clusters as a function of an average similarity between transaction properties according to an embodiment of the present invention.

FIG. 5 is a simplified plot of the estimated number of clusters (est) as a function of the average similarity between transactions (AvgSim) for the value N=15. As the average similarity between transactions increases from zero to one, the estimated number of clusters decreases from 15 to one. If the average similarity between transactions is equal to zero, then the estimated number of clusters will be equal to the number of transactions since all the transactions are dissimilar. On the other hand, if the average similarity between transactions is equal to one, the estimated number of clusters is equal to one, with all transactions being grouped into a single cluster. These two extremes represent the two ends of the range plotted in FIG. 5.

Figure 6:
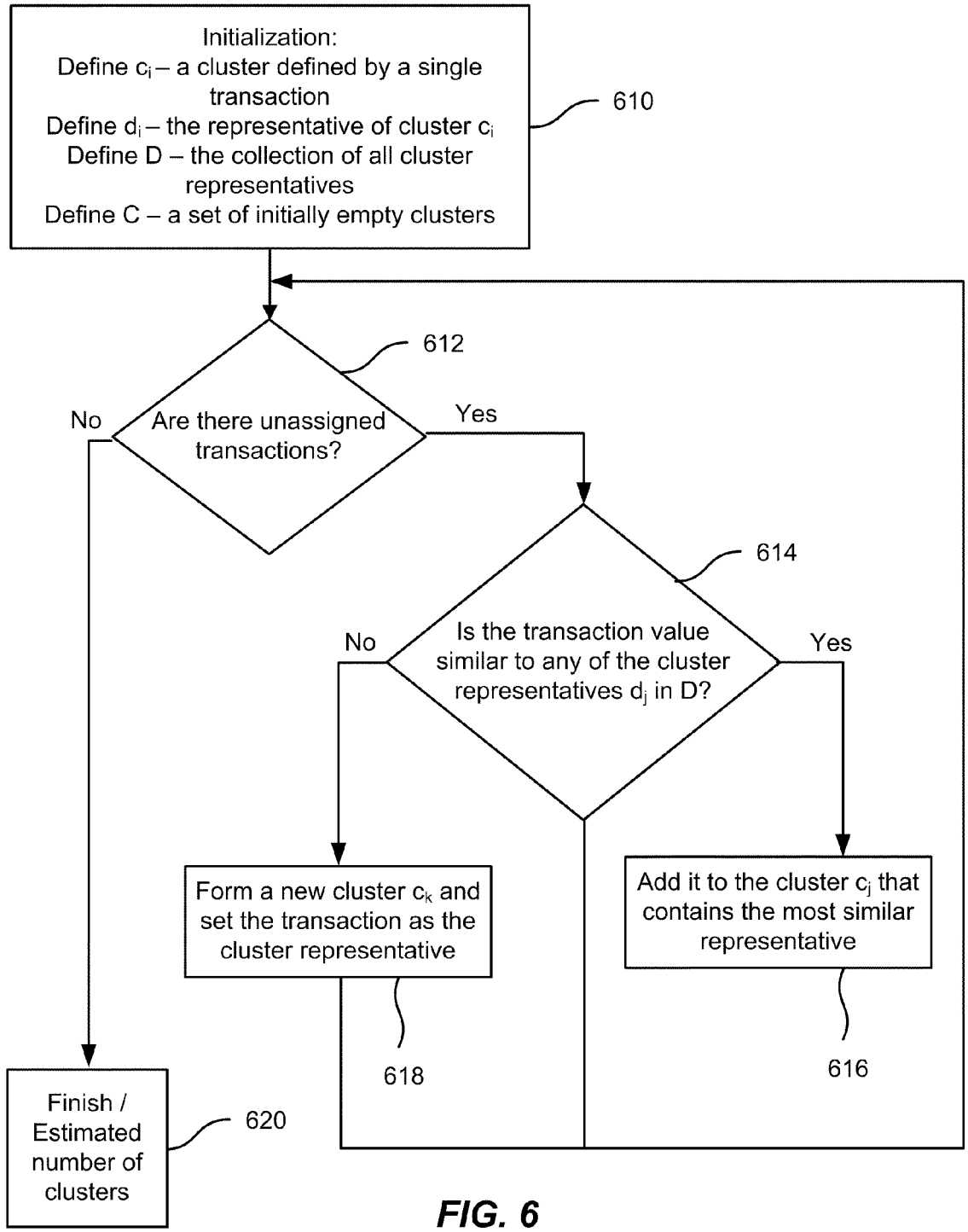
FIG. 6 is a simplified flowchart illustrating a method of clustering according to an embodiment of the present invention.

Alternatively, the average similarity between transactions can be determined using a clustering method, for example, the method described in relation to FIG. 3. FIG. 6 is a simplified flowchart illustrating a method of clustering according to an embodiment of the present invention. The clustering algorithm illustrated in FIG. 6 provides an estimated number of clusters used to determine initial weights at a relatively low cost of computation. Suppose a set of n transactions with a comparator method $CMP(v_1, v_2)$ for each transaction property v. The clustering algorithm would cluster the transactions as follows. In an initialization step 610, the following parameters would be defined:

Define $c_i$—a cluster defined by a single transaction
Define $d_i$—the representative (i.e., delegate) of cluster $c_i$. This representative is the cluster's single representative.
Define D—the collection of all cluster delegates or representatives
Define C—a set of initially empty clusters.

A determination is made of whether there are unassigned transactions (612). Each of the transactions will have a set of property values. Referring to Table 1, there are seven transactions, each with two property values. For each unassigned transaction (also referred to as a value instance), a determination is made if the property value (e.g., IE as the browser type property) is similar to any of the cluster representatives $d_j$ in D (614). A corresponding comparator is used to determine the similarity between the unassigned transaction and the various clusters. If the unassigned transaction is similar to a cluster representative, then the transaction is added to this cluster (616). A threshold value is used to determine of the transaction is similar enough to be included in the existing cluster. On the other hand, if the unassigned transaction is not similar to any of the cluster representatives (i.e., similarity is less than a predetermined threshold), then a new cluster is formed and the transaction is set as the representative for the new cluster (618).

After all the transactions have been considered, the clustering algorithm finishes operation (620), providing an estimated number of clusters for the transactions of interest.

Based on the estimated number of clusters, either computed as illustrated in equation (3) or FIG. 6, embodiments of the present invention compute the coefficients or weights applied to the transaction properties. In order to determine the weights for the various properties in equation (5) below, embodiments of the present invention weight the properties that characterize the user more heavily than other properties. This weighting based on characterization can be referred to as the distribution of properties for a single user. For example, suppose that a user logs in from various places in the world—from the United States, from Egypt, from Japan—but always using an Apple Macbook and Safari. For this user, the OS and the browser stay constant, but the location from which the user logs in changes for almost every login transaction. For this user, the OS and the browser characterize the user well in comparison to the user's location. The user's location does not characterize him or her well because this user does not log in from a specific location, but various locations. Thus, the weight on the property associated with the location of the user will be less than the weight on the properties associated with the OS and the browser type for this user.

It should be noted that a location is typically given a high weight in accordance with the high correlation between typical users and their location. There are an extremely large number of possible locations in the world from which a transaction can originate. If two transactions purportedly come from the same user and originate from the same location, the probability that these two transactions do, in fact, come from the same user, is high. In some embodiments, the methods do not rely heavily on using general population statistics for the location property, as it is too diverse. Therefore, in these embodiments, the location can be weighted more heavily, and will, therefore, potentially have a larger effect on the overall similarity.

As a contrary example, the most widely used Internet browser is currently Internet Explorer. Thus, if two transactions are both associated with the Internet Explorer browser, the probability that both transactions come from the same user is much lower than in the location example given above. With the small number of potential browsers in comparison with the large number of potential locations, the browser type does not provide as much information about a particular user and is therefore given a lower weight. Thus, even if the browsers are the same, the probability that the transactions are from the same user is not as high as in the location example and the weights are correspondingly lower. It should be noted that in some cases, divergent outcomes can result, for example, when a common browser is used, the general population statistics will reduce its weight. However, if the browser is rare, it would not be significantly affected by the general population statistics.

Utilizing embodiments of the present invention, both the distribution of properties on an individual user basis as well as based on the distribution of properties among the general population are considered in determining the weights given to the various properties of the transactions.

According to embodiments of the present invention, the similarity between two transactions is computed using equation (4):

$$Sim(t_1, t_2) = \sum_{i=1}^{Properties} \tilde{W}_i(t_1, t_2) \cdot Sim(v_i^{t_1}, v_i^{t_2}), \quad (4)$$

where $\tilde{W}_i$ represents the normalized adjusted weights for the properties indexed by i and $Sim(v_i^{t_1}, v_i^{t_2})$ represents the similarity between a property of the first transaction and the same property of the second transaction.

The normalized adjusted weights (also referred to as factored weights) are calculated as:

$$\tilde{W}_i(t_1, t_2) \frac{CF_i * W_i}{\sum_{i=1}^{Properties} CF_i * W_i}, \quad (5)$$

where $CF_i$ is a correction factor for the distribution of the property with index=i among the general population and $W_i$ is the weight for each property.

Based on the number of clusters for a set of transactions (estimated one of several ways as described above), the weight for a property of the set of transactions can be calculated as:

$$W_i = \frac{k-1}{k + a \cdot (est_i - 1)} + \frac{1}{k} \text{ for } est_i \geq 1 \text{ and} \quad (6)$$

$$W_i = 0 \text{ for } est_i = 0. \quad (7)$$

It should be noted that if the estimated number of clusters is equal to 1, then the weight will also be equal to 1. Additionally, for a large number of estimated clusters, the weight will be asymptotic to the value of 1/k. The value a is the declining velocity for which the weighting value drops to 1/k. The inventors have determined that weights of about 0.16 are appropriate for transactions that form a large number of clusters, thus, k=7 and a=3 can be used as default values.

Figure 7:
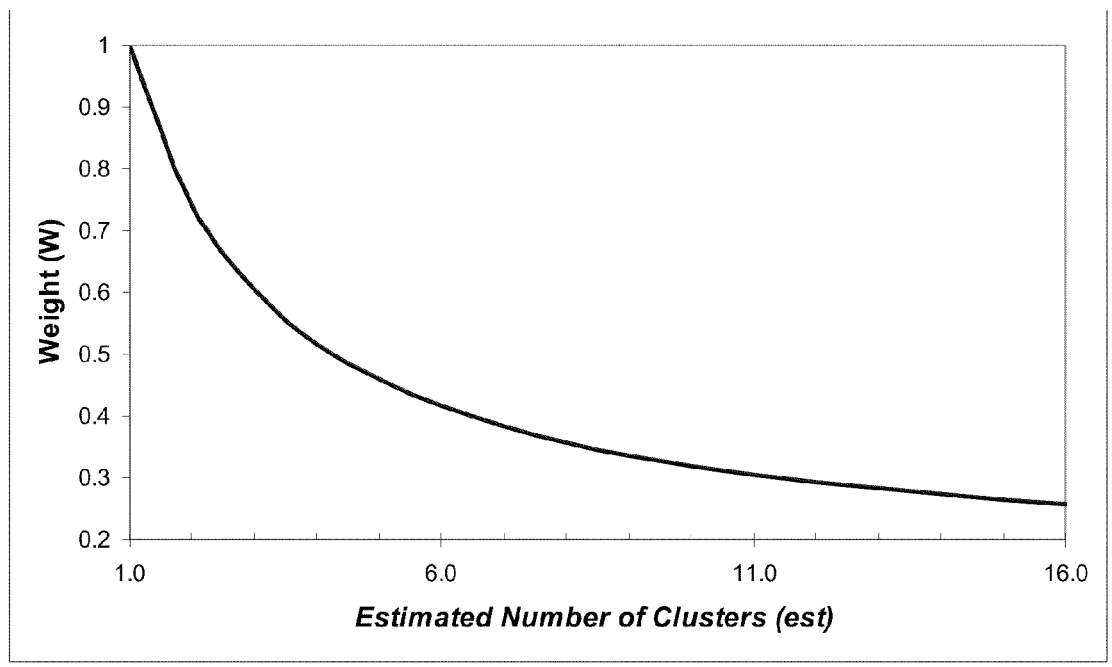
FIG. 7 is a simplified plot of property weight as a function of the estimated number of clusters in a transaction environment according to an embodiment of the present invention.

FIG. 7 is a simplified plot of the weight (W) as a function of the estimated number of clusters in a transaction environment (est) according to an embodiment of the present invention. For the example illustrated in FIG. 7, the parameter values of k=7 and a=3 are utilized.

For the case in which est=0, that is, no clusters were detected, the weight is defined to be zero. Another way to consider this case is that all values are considered to be outliers and no stable behavior is detected. As the estimated number of clusters increases, the weight decreases so that the weight given to the particular property will decrease.

In addition to analyzing user behavior to determine property weights, embodiments of the present invention also determine or modify one or more initial property weights using the distribution of the property among the general population. For a second user, who also travels frequently, logins are consistently performed using Internet Explorer. Accordingly, Internet Explorer would be a property that characterizes this user more than the user's location.

Because Internet Explorer is widely used, the ability of this property to differentiate one user from another user is somewhat limited. Accordingly, the general distribution of the property is considered when determining the weight applied to this property for the user. If the property is "normal" defined in terms of widespread use in the general population, then the weight of the property is decreased.

As a summary statement, the more the property value characterizes the general population, the less this parameter characterizes the particular client. As an example, if all users are using Internet Explorer-7.0, then the browser type and version will not strongly characterize a client, even if this particular browser type and version appear in each transaction the user makes. On the other hand, the more the property is uncommon in the general population, the more this property will be emphasized for a particular user.

Suppose a parameter distribution with a value 'v' and probability of $P_v$. The apriory probability for the observation of two property values, from transactions $t_1$ and $t_2$ is $P_v^{t_1} * P_v^{t_2}$. According to embodiments of the present invention, the weight that should be applied is large if the appearance is rare and small if the appearance is common. Based on this proposition, embodiments of the present invention differ significantly from conventional methods in which the weights are set once for each property. As described more fully below, the initial weights based on the user's distribution are factored during each similarity calculation.

As an example of correction factors to account for the probability of finding the property value in the general population, the following example is provided. Suppose two transactions occur that are characterized by a common property value, for instance the browser type of Internet Explorer. Since this property value is common, it would be preferable to not place a high weight on this property. On the other hand, suppose that the two browsers were common, but different in the comparator result. If the given weight was small, the dissimilarity would have little effect. Therefore, embodiments of the present invention increase the weight for common properties with different comparator results in order to emphasize the dissimilarity. This leads us to an aspect of the present invention: when two values are dissimilar, it would be preferable to conclude general dissimilarity regardless of their frequency, but not the other way around. Two similar values would stress similarity only if they are uncommon. This conclusion can be demonstrated in Table 8.

TABLE 8

| Distinct Values: | | |
| --- | --- | --- |
| Value 1 | Value 2 | Desired weight |
| 90% | 5% | High |
| 50% | 50% | High |
| 5% | 90% | High |
| 5% | 5% | High |
| Identical values: | | |
| Value 1 = Value 2 | | Desired weight |
| 90% | | Low |
| 50% | | Low |
| 5% | | Medium |
| 1% | | High |

Referring to Table 8, the percentage values refer to prevalence in the population. Referring to the first row of the Distinct Values section, value 1=90% means that the first value appears in 90% of all cases; value 2=5% means that the second value appears for 5% of all cases. The rows in Table 8 refer to different cases. In the first case (i.e., the first row), the property value of the first transaction has a prevalence of 90% and the property value of the second transaction has a prevalence of 5%. In the Identical Values section, the first row represents two transactions that share the same value for that property, with a prevalence of 90%.

Based on the reasoning discussed above, a correction factor CF is utilized in embodiments of the present invention and is calculated using equation (8):

$$CF(v_i, t_1, t_2) = 1 - Pr' \cdot Sim(v_i^{t_1}, v_i^{t_2}) \quad (8)$$

where Pr' is the adjusted probability of the occurrence of the property value in the general population and $Sim(v_i^{t_1}, v_1^{t_2})$ is the similarity between a property (property index=i) of the first transaction and the second transaction. As an example, the correction factor for the browser type property could be computed for two transactions $t_1$ and $t_2$. According to embodiments of the present invention, the correction factor (CF) will yield a low value only to similar and frequent values.

In some embodiments, the probability curve may be have a sharper slope than desired for properties having higher frequencies. Accordingly, the adjusted probability of the property in the general population is based on the probability of the property in the general population (P) and is defined as:

$$Pr' = \frac{1}{C_{v_i}^{t_1} * C_{v_i}^{t_2} / b + \frac{b-1}{b}}, \quad (9)$$

where $C_{v_i}^{t_1} \equiv 1/P_{v_i}^{t_1}$ and $C_{v_i}^{t_2} \equiv 1/P_{v_i}^{t_2}$, based on the transformation:

$$Pr' = P_{v_i}^{t_1} * P_{v_i}^{t_2} \xrightarrow{C_{v_i}^t = 1/P_{v_i}^t} 1/C_{v_i}^{t_1} * 1/C_{v_i}^{t_2} \xrightarrow{slide} \frac{1}{C_{v_i}^{t_1} * C_{v_i}^{t_1} / b + \frac{b-1}{b}} \quad (10)$$

In this transformation, b moderates the slope as it is in the denominator of $C_{v_i}^{t_1} * C_{v_i}^{t_2}$. The expression (b−1)/b is a normalization value for the case $C_{v_i}^{t_1} * C_{v_i}^{t_2} = 1$. According to the normalization, the expression as a whole will equal 1 in that case. In some embodiments, b=4, but the present invention is not limited to this particular value. The result of the transformation used in equation (10) is to reduce the slope of the probability curve as a function of the frequency of the property values.

Referring once again to FIG. 2, a similarity is computed between each of the properties of the first transaction and the second transaction (212) as illustrated in equation (4). The initial weight is related to the behavior of the user (i.e., the distribution of parameters for the user). Additionally, the distribution of the property in the general population is considered. The initial weights are adjusted based on the commonness of the property among the general population (214) as illustrated by the correction factor in equation (8). According to embodiments of the present invention, if the property has few values, then the adjusted weight will be large. On the other hand, if the property has many values, then the adjusted weight will be small. Another perspective on the adjusted weights and the correction factor is that if the property is very common, it should be de-emphasized, whereas if the property is uncommon, it should be emphasized.

The adjusted weights are normalized (216) and the similarity between the first transaction and the second transaction can be computed (218). As described more fully in the co-pending application referenced in paragraph [0001], the similarity between transactions can be used in clustering transactions.

Figure 4A:
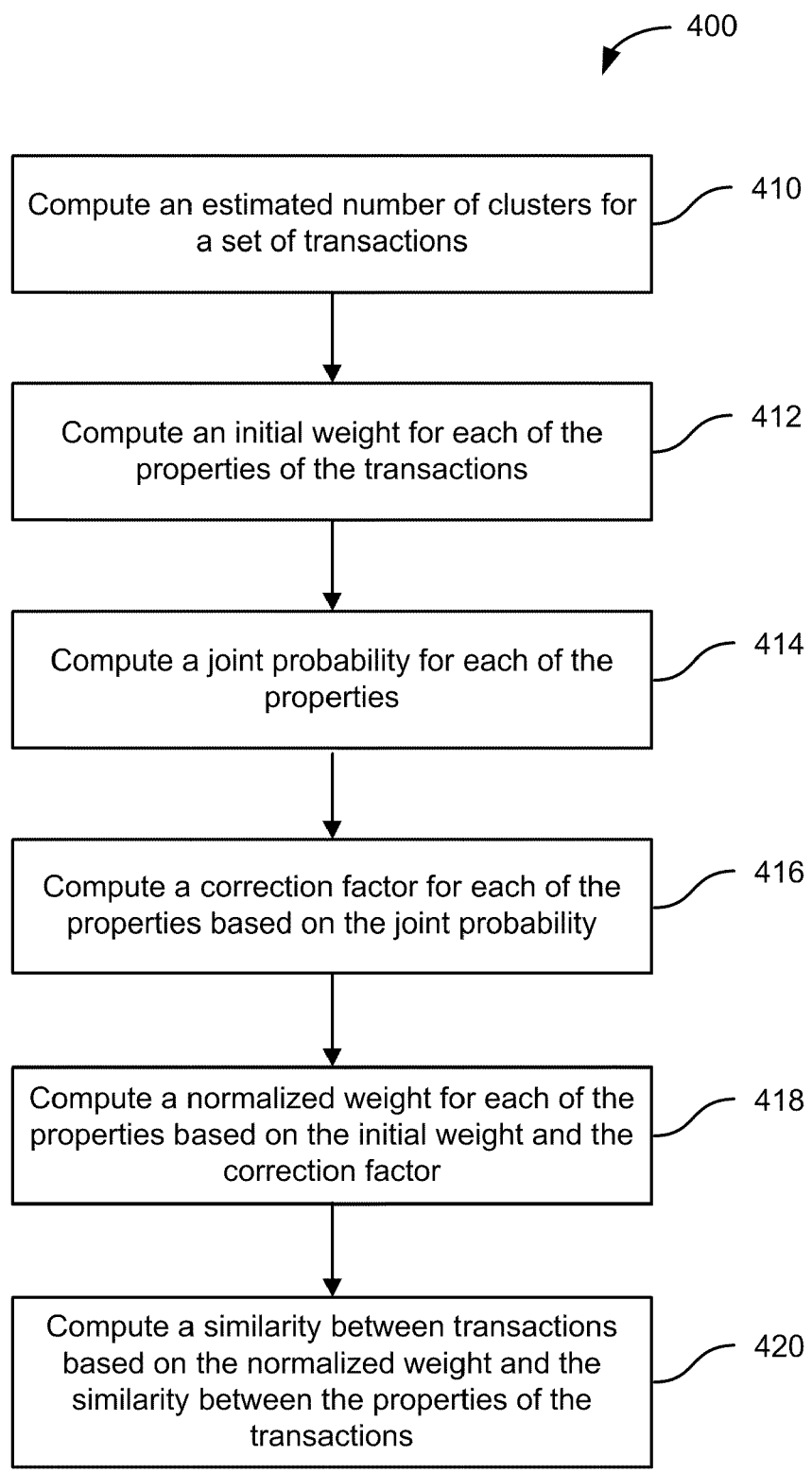
FIG. 4A is a simplified flowchart illustrating a method of determining a similarity between transactions according to another embodiment of the present invention.

FIG. 4A is a simplified flowchart illustrating a method of determining a similarity between transactions according to another embodiment of the present invention. The method 400 includes computing an estimated number of clusters for a set of transactions (410). The estimated number of clusters can be calculated using equation (3), the method described in relation to FIG. 6, or other suitable method to determine est. Given the estimated number of transactions, an initial weight can be computed for each of the properties associated with the transactions (412). Properties such as geographical location, operating system, browser (including the components browser type and browser version), connection, and the like are discussed more fully throughout the present specification. A joint probability is computed for each of the properties using equation (9) (414). The joint probability is based on the product of the probabilities of the property in the general population shifted by the parameter "b" in order to reduce the slope of the curve as described in relation to equation (10). A correction factor is computed for each of the properties based on the joint probability (416).

A normalized weight is computed for each of the properties based on the initial weight computed in step 412 and the correction factor computed in step 416 (418). Given the normalized weight and the similarity between the properties of the transactions, a similarity between transactions is computed (420). Additional detail related to these computations is provided in FIG. 4B.

Figure 4B:
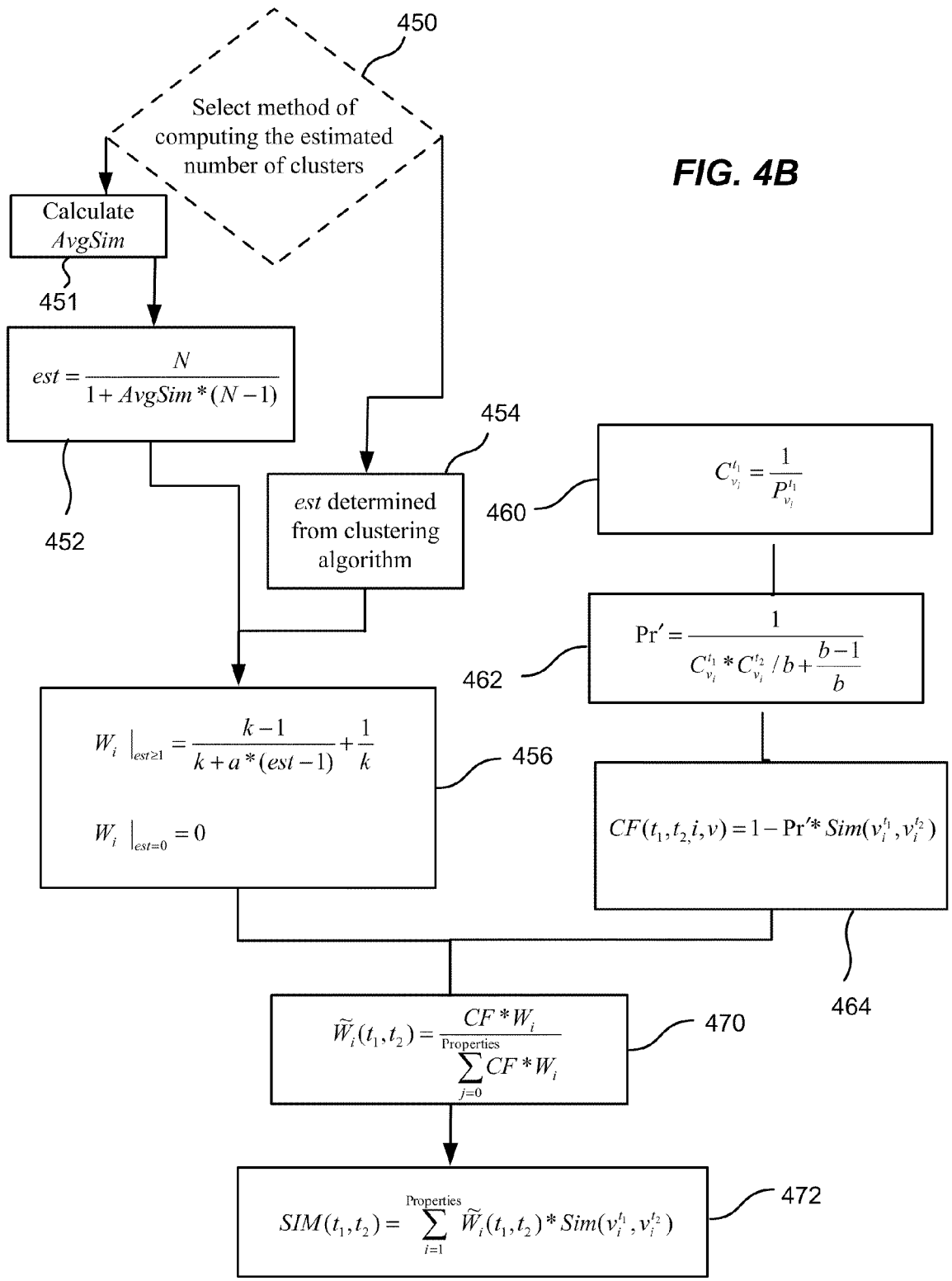
FIG. 4B is a simplified flowchart illustrating calculations used in performing the method illustrated in FIG. 4A.

FIG. 4B is a simplified flowchart illustrating calculations used in performing the method illustrated in FIG. 4A. A method of computing the estimated number of clusters is optionally selected (450). The method of estimating the number of clusters may be set by default, in which case this step is optional. The estimated number of clusters for a set of transactions can be calculated using equation (3) based on the number of transactions and the average similarity between transaction properties (451 and 452) or using the clustering method described in relation to FIG. 6 (454). The estimated number of clusters (est) is used to compute an initial weight (456) using equation (6) if there are one or more clusters for the transactions. The initial weight is set to zero if there are no clusters formed based on the transactions as shown in equation (7). The initial weight is a function of the estimated number of clusters as well as the parameters k and a. Steps 450-456 can be considered to provide an initial weight based on the internal distribution between the transactions (i.e., the distribution of properties on an individual user basis). That is, for the set of transactions, the distribution of the properties between the user's transactions is accounted for using these steps. This distribution is independent of the distribution of the property throughout the general population. The initial weight will be higher if the number of clusters is low and will drop as the number of clusters increases.

In parallel with the computations in steps 450-456, or in serial, computations are performed to determine a correction factor related to the distribution of the property in the general population. The inverse of the probability of the property occurring in the general population is defined as $$C_{v_i}^{t_1} \equiv \frac{1}{P_{v_i}^{t_1}} (460).$$

Because the apriory probability for the observation of two property values from transactions $t_1$ and $t_2$ is $P_{v_i}^{t_1} * P_{v_i}^{t_2}$, the joint probability is computed using equation (9) (462). Using the joint probability and the similarity of the properties measured between two transactions, the correction factor is computed using equation (8) (464). Referring to equation (8), the correction factor is equal to one minus the joint probability times the similarity between property values. Steps 460-464 can be considered to provide a correction factor for the initial weight based on the distribution of property values throughout the general population. As described more fully throughout the present specification, the commonness of the particular property (e.g., the browser type) is thus accounted for in determining the weight given to a property and is used in determining the similarity between transactions.

The normalized weight for a property is computed based on the initial weight (internal distribution) and the correction factor (general distribution) (470). The normalization is performed by dividing the corrected property weight for a given property by the sum of the corrected property weights for all properties. The similarity between transactions is computed as the weighted average of the normalized weights times the similarity between properties (472). The sum is computed over the various properties associated with the transactions.

Some embodiments of the present invention neglect outliers in computing the weights for the properties associated with user behavior. As an example, outliers can be discarded from the weight calculations. A variable named "Neglectable Value" can be defined and set to the value of 3. Every property value that appears in less then three instances is not considered in the counting of different property values. In these embodiments, outliers are not considered as characteristics of client behavior. In some cases, these outliers may be the fraudulent transactions it is preferable to detect and mitigate. Other embodiments provide methods and systems in which, if the group of neglected outliers is a larger fraction, they are considered.

These embodiments provide for modification of the coefficients based on negligible values, significant values, and unknown values. Equation (11) is a property weight (W') adjusted for these three values.

$$W' = \text{Neg\_Fraction} \cdot W_{neg} + \text{Sig\_Fraction} \cdot W_{sig} + \text{Ukn\_Fraction} \cdot W_{ukn} \quad (11)$$

where Neg_Fraction is the fraction of the transactions containing negligible values, Sig_Fraction is the fraction of the transactions containing significant values, and Ukn_Fraction is the fraction of the transactions containing unknown values.

Figure 8A:
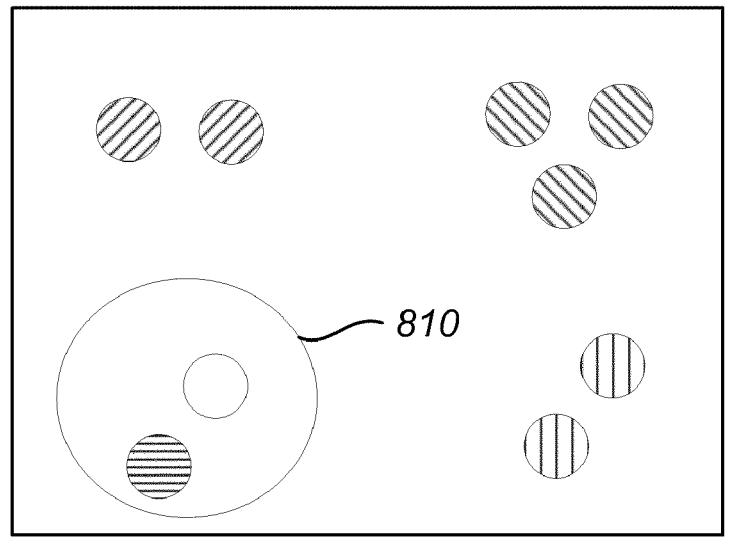
FIGS. 8A and 8B are simplified diagrams illustrating two cases with different unknown values according to an embodiment of the present invention.
Figure 8B:
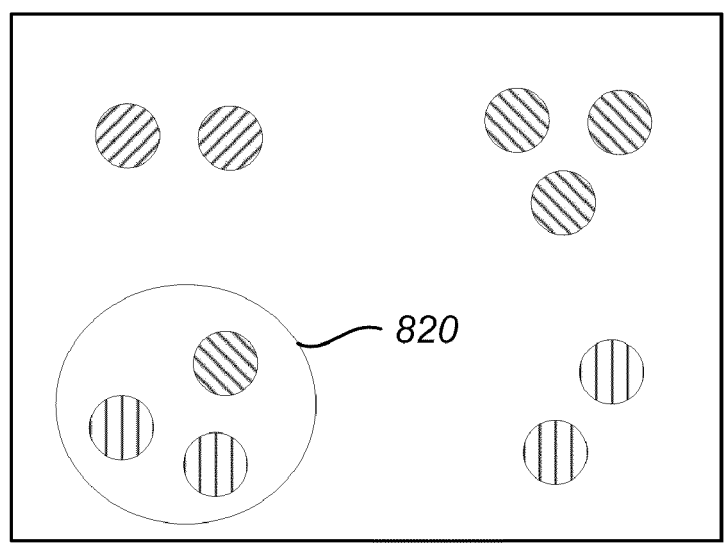

FIGS. 8A and 8B are simplified diagrams illustrating two cases with different unknown values. These unknown values can be property values. In the first case, the unknown values (circle 810) are both different from the rest of the values. The clustering inaccuracy illustrated in case 1 is not severe since the transactions included in the unknown group are values that are not present in the distribution. An example of an unknown value occurring may be that, for technical reasons, the browser type, instead of being determined as Firefox, Internet Explorer, or the like, can have an unknown value. Since the browser type in this example cannot be determined, it is handled as an unknown value.

In the second case, however, the inaccuracy is more severe since the transactions in the unknown group (circle 820) are values that are also present in the distribution. Thus, embodiments of the present invention can make a distinction between the two cases by changing the model parameter values for each case.

In order to include negligible and unknown values in the computation of the weights, an embodiment of the present invention utilizes equation (11), where Count(Neg)=number_of_transactions_containing_negligible_value, (12)

Count(Sig)=number_of_transactions_containing_significant_value, (13)

Count(Ukn)=number_of_transactions_containing_unknown_value, and (14)

Count(All)=Count(Neg)+Count(Sig)+Count(Ukn). (15)

For each group, $$Neg\_Fraction = Count(Neg)/Count(All), \quad (16)$$

$$Sig\_Fraction = Count(Sig)/Count(All), \text{ and} \quad (17)$$

$$Ukn\_Fraction = Count(Ukn)/Count(All). \quad (18)$$

In some embodiments, the value for $W_{ukn}$ is set to a low value, possibly similar to the constant "1/k" as described above. Generally, other weights can be defined as described above.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of computing a similarity between a first transaction having a set of properties and a second transaction having the set of properties, the method comprising:
    computing an initial weight for each of the properties of the set of properties;
    computing a similarity between each of the properties of the first transaction and the properties of the second transaction;
    adjusting the initial weight for each of the properties based on a measure of the commonness of each of the properties of the set of properties;
    normalizing the adjusted weights; and
    computing the similarity by summing the products of the normalized adjusted weights and the computed similarities.

2. The method of claim 1 wherein the set of properties include at least one of browser, operating system, geographical location, or connection.

3. The method of claim 2 wherein the browser properties includes a browser version and the operating system property includes an operating system version.

4. The method of claim 1 wherein the first transaction and the second transaction are Internet log-ins.

5. The method of claim 1 wherein computing the initial weight comprises determining an estimated number of clusters for a transaction environment.

6. The method of claim 5 wherein the estimated number of clusters is equal to a total number of transactions divided by the sum of 1 and the product of an average similarity between transaction property values times the total number of transactions minus one.

7. The method of claim 6 wherein the determining an estimated number of clusters comprises, while a transaction is unassigned:
    determining if a similarity between a value of the transaction and a value for a cluster representative of a cluster is less than a predetermined threshold;
    adding the transaction to the cluster if the similarity is greater than or equal to the predetermined threshold; and
    forming a new cluster including the transaction if the similarity is less than the predetermined threshold.

8. The method of claim 1 wherein adjusting the initial weights for the properties includes increasing the initial weight for a common property associated with transactions having a similarity less than a predetermined threshold.

9. A system for determining a similarity between a first transaction having a set of properties and a second transaction having the set of properties, the system comprising:
    a data processor;
    a computer-readable medium storing a plurality of instructions for controlling the data processor to compute the similarity, the plurality of instructions comprising:
        instructions that cause the data processor to compute an initial weight for each of the properties of the set of properties;
        instructions that cause the data processor to compute a similarity between each of the properties of the first transaction and the properties of the second transaction;
        instructions that cause the data processor to adjust the initial weight for each of the properties based on a measure of the commonness of each of the properties of the set of properties;
        instructions that cause the data processor to normalize the adjusted weights; and
        instructions that cause the data processor to compute the similarity by summing the products of the normalized adjusted weights and the computed similarities; and
    a communications module.

10. The system of claim 9 wherein the set of properties at least one of browser, operating system, or geographical location.

11. The system of claim 9 wherein the first transaction and the second transaction are Internet log-ins.

12. The system of claim 9 wherein the plurality of instructions further comprise instructions that cause the data processor to determine an estimated number of clusters for a transaction environment.

13. The system of claim 12 wherein the estimated number of clusters is equal to a total number of transactions divided by the sum of 1 and the product of an average similarity between transaction property values times the total number of transactions minus one.

14. The system of claim 12 wherein the plurality of instructions further comprise:
    instructions that cause the data processor to determine that a transaction is unassigned;
    instructions that cause the data processor to determine if a similarity between a value of the transaction and a value for a cluster representative of a cluster is less than a predetermined threshold;
    instructions that cause the data processor to add the transaction to the cluster if the similarity is greater than or equal to the predetermined threshold; and
    instructions that cause the data processor to form a new cluster including the transaction if the similarity is less than the predetermined threshold.

15. The system of claim 9 wherein the plurality of instructions further comprise instructions that cause the data processor to increase the initial weight for a common property associated with transactions having a similarity less than a predetermined threshold.

16. A method of determining a similarity between two transactions of a set of transactions, each of the transactions having a plurality of properties, the method comprising:
    computing an estimated number of clusters for the set of transactions;
    computing an initial weight for each of the plurality of properties of the transactions;
    computing a joint probability for each of the plurality of properties;
    computing a correction factor for each of the properties based on the joint probability;
    computing a normalized weight for each of the plurality of properties based on the initial weight and the correction factor;

determining a similarity between the plurality of properties; and computing the similarity between the two transactions based on the normalized weight and the similarity between the plurality of properties.

17. The method of claim 16 wherein the plurality of properties at least one of browser, operating system, geographical location, or connection.

18. The method of claim 16 wherein the estimated number of clusters is equal to a total number of the set of transactions divided by the sum of 1 and the product of an average similarity between the transactions times the total number of the set of transactions minus one.

19. The method of claim 16 wherein the initial weight is inversely related to the number of clusters.

20. The method of claim 16 wherein the set of transactions are associated with Internet log-ins.

21. The method of claim 16 wherein the estimated number of clusters is equal to a total number of transactions divided by the sum of 1 and the product of an average similarity between transactions times the total number of transactions minus one.

* * * * *